(12) United States Patent
Tikka

(10) Patent No.: US 6,216,447 B1
(45) Date of Patent: Apr. 17, 2001

(54) TWO-CYCLE CARBURETOR GASOLINE ENGINE FOR SNOWMOBILES, LAWN MOWERS, MOTORCYCLES OR OUTBOARD MOTORS

(76) Inventor: Mats Tikka, Storgatan 36, S-962 32 Jokkmokk (SE)

( * ) Notice: Subject to any disclaimer, the term of this patent is extended or adjusted under 35 U.S.C. 154(b) by 0 days.

(21) Appl. No.: 09/369,633

(22) Filed: Aug. 6, 1999

Related U.S. Application Data

(63) Continuation-in-part of application No. PCT/SE98/00216, filed on Feb. 8, 1998.

(30) Foreign Application Priority Data

Feb. 10, 1997 (SE) .................................................. 9700459

(51) Int. Cl.[7] .................................................. F01N 3/00
(52) U.S. Cl. .................................. 60/272; 60/298; 60/299
(58) Field of Search ............................. 60/272, 299, 298, 60/307, 320

(56) References Cited

U.S. PATENT DOCUMENTS

| | | | | |
|---|---|---|---|---|
| 3,835,645 | * | 9/1974 | Zoleta .................................... | 60/298 |
| 3,968,649 | * | 7/1976 | Edwards ................................. | 60/298 |
| 5,396,797 | * | 3/1995 | Suzuki .................................... | 60/298 |
| 5,729,972 | * | 3/1998 | Hayashi .................................. | 60/299 |

FOREIGN PATENT DOCUMENTS

| | | | |
|---|---|---|---|
| 19504208 | 8/1995 | (DE) . | |
| 0325111 | 7/1989 | (EP) . | |
| 0401178 | 12/1990 | (EP) . | |
| 358222910A | * 12/1983 | (JP) .................................... | 60/299 |

* cited by examiner

*Primary Examiner*—Thomas Denion
*Assistant Examiner*—T. B. Trieu
(74) *Attorney, Agent, or Firm*—Nils H. Ljungman & Associates

(57) ABSTRACT

A two cycle engine comprising an induction system to induct fuel and air into said two cycle engine, at least one cylinder arrangement to combust the fuel and air mixture of said two cycle engine, and a piston arrangement disposed in said at least one cylinder arrangement. The at least one cylinder arrangement is configured to combust the fuel and air mixture of the two cycle engine during each two cycle movement of said piston arrangement. The engine also has an ignition system disposed to combust the fuel and air mixture in the at least one cylinder during each two cycle movement of the piston arrangement and an exhaust system to exhaust gases from the at least one cylinder. The exhaust system comprises a reactor and a precombustion chamber, the precombustion chamber is disposed between the at least one cylinder and the reactor. The engine also includes a heat exchanger configured and disposed to transfer heat from exhaust gases from the reactor to the precombustion chamber.

20 Claims, 4 Drawing Sheets

US 6,216,447 B1

TWO-CYCLE CARBURETOR GASOLINE ENGINE FOR SNOWMOBILES, LAWN MOWERS, MOTORCYCLES OR OUTBOARD MOTORS

This application is a continuation-in-part of PCT/SE98/00216 filed Feb. 8, 1998.

BACKGROUND OF THE INVENTION

1. Field of the Invention

The present invention relates to a two cycle or two stroke engine. The present invention also relates to a method of cleaning the exhaust gases emitted from a two-stroke engine.

2. Background Information

Two cycle or two stroke carbureted gasoline engines release an amount of non-combusted fuel through their exhaust pipe. The amount of non-combusted fuel thus emitted will depend on the engine speed. The exhaust system is normally adapted to generate a back pressure to counteract this emission, although the back pressure will only function effectively at a given engine speed. The amount of non-combusted fuel emitted through the exhaust system will thus vary with varying engine speeds. When fitting a conventional reactor burner in the exhaust system, there is a danger that the reactor will become too hot when large quantities of non-combusted fuel are emitted from the engine.

OBJECT OF THE INVENTION

An object of the present invention is to provide a reactor arrangement that will function effectively even on two-stroke engines and that will have a long useful life.

SUMMARY OF THE INVENTION

This object can be achieved in principle with the aid of a combustion chamber placed upstream of the reactor and also with the aid of a heat exchanger for transferring heat from the reactor exhaust gases to the combustion chamber. The inventive reactor arrangement can have a precombustion chamber upstream of the reactor, and a heat exchanger for transferring heat from the reactor exhaust gases to the precombustion chamber. The precombustion chamber can be comprised of an expansion chamber for tuning the resistance of engine exhaust gases. A second heat exchanger can be downstream in the reactor exhaust gases to transfer heat to the gas present in the conduit extending between the precombustion chamber and the reactor inlet. The heat exchanger can be comprised of a conduit means that extends transversely through the expansion chamber, the conduit means having an aerodynamic cross-sectional shape so as to have the least possible disturbing effect on the flow in the expansion chamber. The heat exchanger conduit means can have a cross-sectional shape essentially in the form of a symmetrical wing-profile, and can be provided with fins.

Additionally, there can be a method of cleansing the exhaust gases from a two-stroke engine by means of a reactor arrangement, characterized by initiating a precombustion upstream of the actual reactor combustion, with the aid of heat taken from the reactor exhaust gases. The method can also include initiating the precombustion process in an engine exhaust-gas expansion chamber and using the expansion chamber to tune the exhaust resistance of the engine.

The heat exchanger can be heated to such an extent by the exhaust gases from the reactor as to ignite non-combusted fuel in the combustion chamber when the amount of non-combusted fuel increases, therewith providing a self-regulating system.

The present invention relates to a reactor arrangement that is particularly suitable for use with two-stroke engines. The invention also relates to a method of cleaning the exhaust gases emitted from a two-stroke engine.

The above-discussed embodiments of the present invention will be further discussed hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention will now be described in more detail with reference to an exemplifying embodiment thereof and also with reference to the accompanying drawings, in which.

DESCRIPTION OF THE PREFERRED EMBODIMENT

Figure 1:
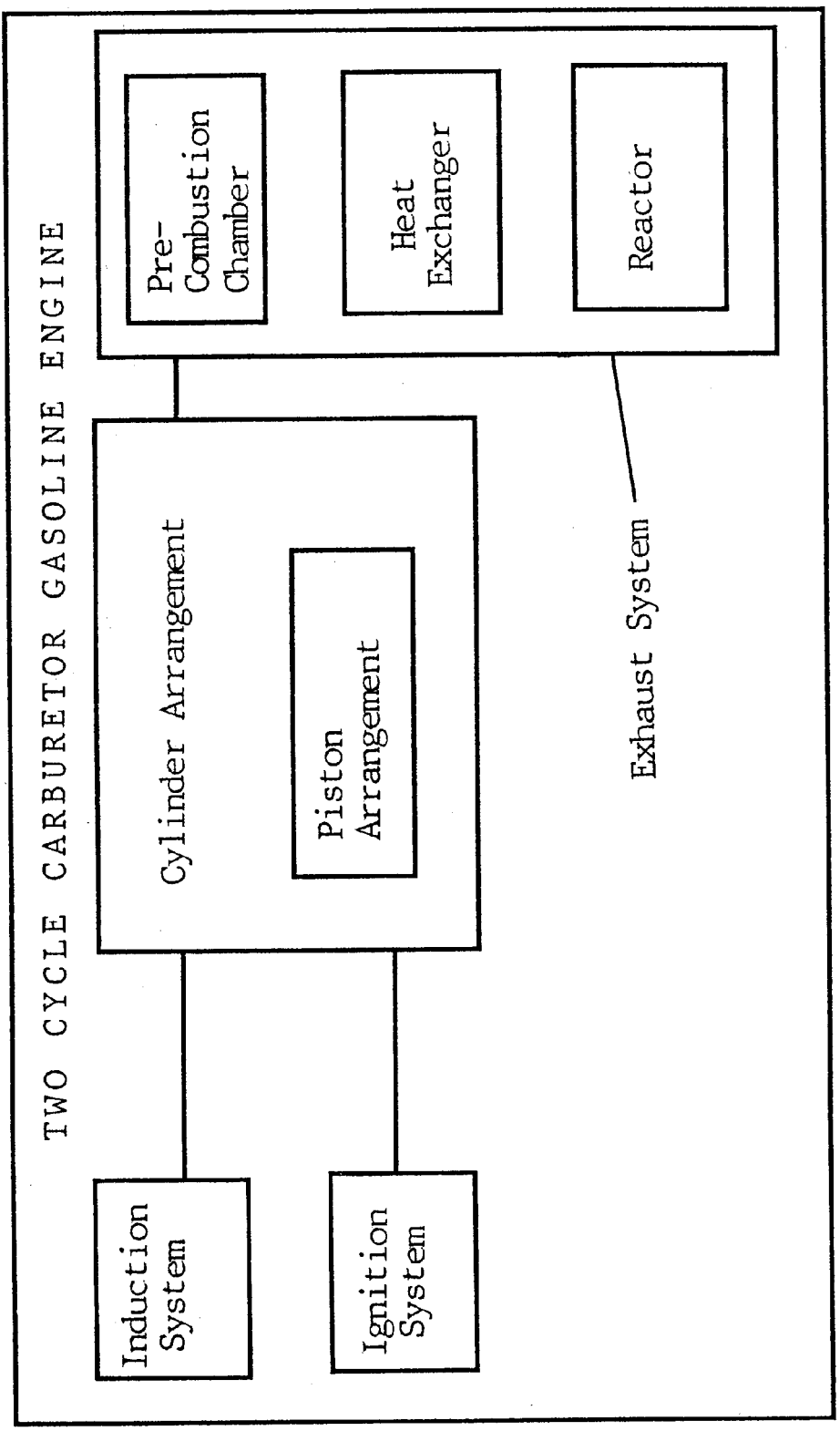
FIG. 1 shows a block diagram of an two cycle engine arrangement wherein the present invention may be utilized.

FIG. 1 illustrates a two cycle carburetor gasoline engine in which the present invention may be utilized. FIG. 1 shows an injection system and an ignition system connected to a cylinder arrangement. The cylinder arrangement contains a piston arrangement. After the cylinder arrangement is an exhaust system, and the exhaust system includes a precombustion chamber, a reactor and a heat exchanger.

Figure 2:
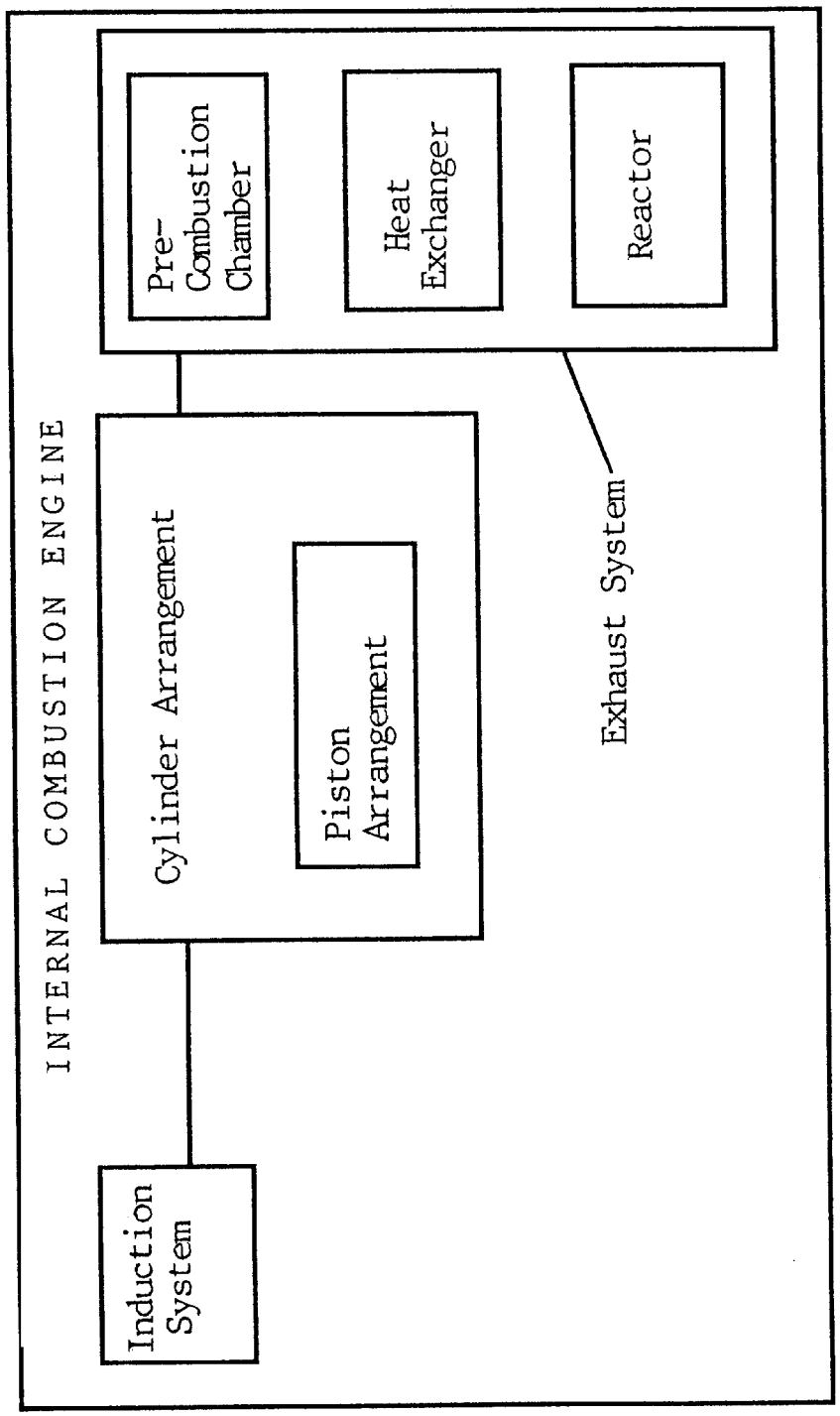
FIG. 2 shows a block diagram of another embodiment of an engine wherein the present invention may be utilized.

FIG. 2 illustrates another embodiment of an internal combustion engine wherein the present invention may be utilized. FIG. 2 shows an injection system connected to a cylinder arrangement. The cylinder arrangement contains a piston arrangement. After the cylinder arrangement is an exhaust system, and the exhaust system includes a precombustion chamber, a reactor and a heat exchanger.

Figure 3:
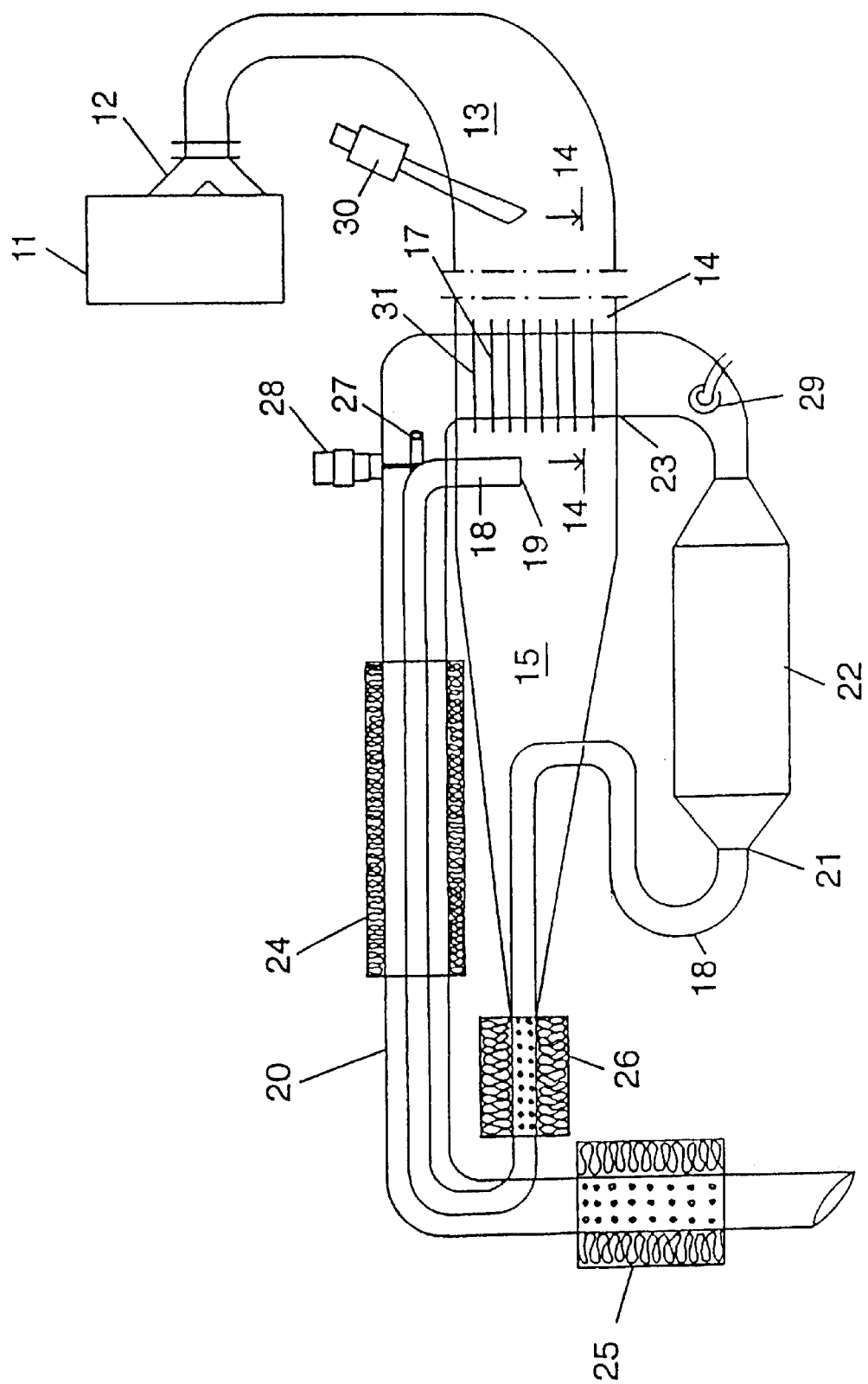
FIG. 3 is a schematic illustration of an inventive catalyst arrangement.

FIG. 3 shows an engine 11 comprising an exhaust manifold 12 and an exhaust pipe which forms an expansion chamber 13, 14, 15. The first part 13 of the expansion chamber widens in the principle of a curved cone, while the last part 15 of said chamber narrows in the principle of a cone having a closed end. The center part 14 of the expansion chamber has a generally constant cross-sectional area and includes a heat exchanger 17. Mounted behind the heat exchanger 17 is an outlet pipe 18 that extends transversely to the expansion chamber and whose outlet orifice 19 is located close to the center of the expansion chamber. This outlet pipe 18 leads into an outer pipe 20 and extends along said outer pipe, whereby the two pipes function as a heat exchanger where heat is transferred from the outer pipe 20 to the inner pipe 18. The pipe 18 leads into the last part 15 of the expansion chamber and exits from the expansion chamber 13, 14, 15 and into the inlet 21 of a conventional catalyst 22. It is not necessary for the pipe 18 to pass back into the expansion chamber in the manner shown. The outlet of the catalyst 22 is coupled to the inlet 23 of the heat exchanger 17, and the outlet of the heat exchanger is connected as an inlet to the pipe 20. The pipe 20 is provided with two mufflers 24,25 and the pipe 18 is provided with one muffler 26. The pipe 18 is provided with a by-pass valve 27 which is controlled by a device 28 connected to a sensor 29 for sensing the catalyst device 22 connected to a sensor 29 for sensing the catalyst outlet temperature. An air supply device 30 may be coupled to the front part 13 of the expansion chamber, as shown. Although the air supply device 30 is not normally required, it can, nevertheless, be of value in certain types of engines.

Figure 4:
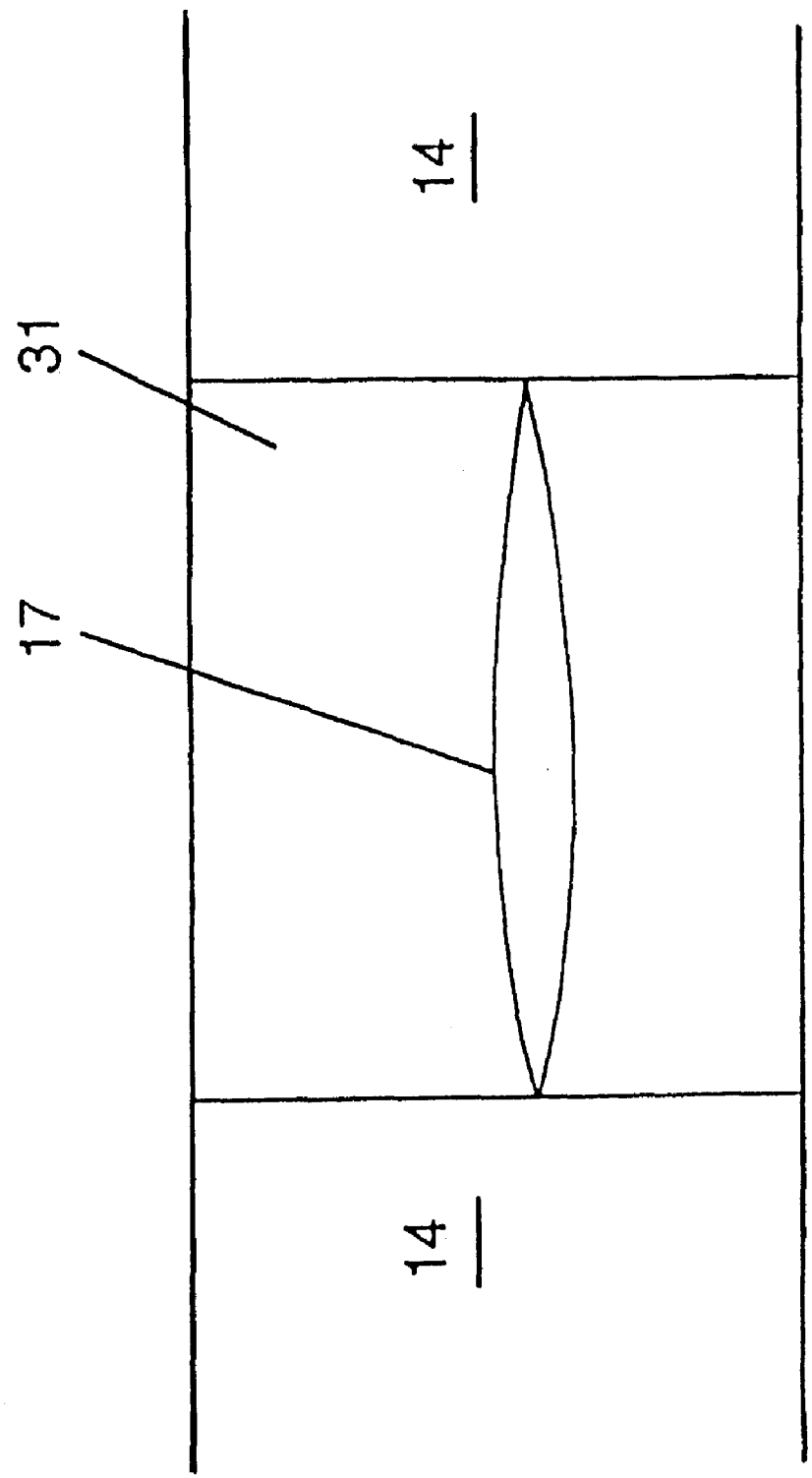
FIG. 4 is a sectional view taken on the line 4—4 in FIG. 3.

As will be seen from FIG. 4, the heat exchanger 17 has a streamline cross-sectional shape, and includes a number of fins 31. Because of its streamline shape, the heat exchanger will not have any disturbing effect on the function of the expansion chamber 13, 14, 15. The length of the expansion chamber shall be adapted to the type of engine concerned, and the center part 14 of the expansion chamber is therefore ideally produced in different lengths to suit different engines. The catalyst arrangement may be identical in other respects for a large number of different engines, with the exception that the inlet 19 of the pipe 18 can have different throttles for different engines. The pipe inlet or orifice 19 will preferably not be directed axially in the expansion chamber, but preferably transversely thereto, as shown.

The manner in which the illustrated catalyst arrangement operates will now be described.

When the engine 11 is started, the catalyst 22 will be heated-up and the catalytic combustion commences. When the engine reaches the optimum number of revolutions for which the expansion chamber 13, 14, 15 is dimensioned, the engine will release a minimum of non-combusted fuel to the expansion chamber and the catalyst will operate at a suitable temperature. When the engine is run at another speed, more non-combusted fuel is released from the engine and the catalyst exhaust gases will become hotter and thereby heat the heat exchanger 17 to a temperature at which fuel in the expansion chamber will be definitely ignited. As a result of this combustion, less fuel will be delivered to the catalyst 22 and overheating of the catalyst therewith prevented. There is thus obtained a self-regulating system and pulsating combustion of fuel taking place in the expansion chamber will be heard by the driver, for instance. When the engine exhaust gases contain a certain amount of non-combusted fuel, combustion will take place in the expansion chamber with each sixth revolution of the engine, for instance. The driver of a snow scooter or snowmobile, a motorcycle, a motorboat or some other engine-powered appliance, will therefore obtain information as to when the engine is most effective, for instance when it does not stutter or judder as a result of precombustion, and the driver is able to adapt the engine speed accordingly.

As an additional safety measure against overheating of the catalyst 19, the arrangement may include a by-pass valve 27 that opens when the temperature sensor 29 registers a dangerously high catalyst exhaust gas temperature. The by-pass valve 27 may ideally be designed to require the valve to be re-set in a workshop, or garage, since the valve shall not normally be opened. Because the by-pass valve is coupled upstream of the mufflers 24, 25, it will be clearly heard when the valve opens.

It is advantageous that the pipe 18 extends within the pipe 20 so that the pipe 18 will be heated by the catalyst exhaust gases, i.e. so that the catalyst exhaust gases heat the catalyst inlet gas.

In a simpler embodiment of the invention, the pipe 18 and its orifice 19 may, for example, extend directly from the expansion chamber to the inlet 21 of the catalyst 22, i.e. without the pipe 18 extending within the pipe 20 and without the pipe 18 reentering into the expansion chamber. This results in a considerably simplified construction of the inventive arrangement.

Naturally, one or more of the mufflers 24–26 may be excluded, if considered suitable to do so.

It will also be noted that the connection of the catalyst outlet to the inlet 23 of the heat exchanger 17 may be affected through the medium of a first outer chamber (not shown) to the expansion chamber, while the connection of the pipe 20 to the outlet of the heat exchanger may be effected through the medium of a second outer chamber (not shown) to the expansion chamber.

It will be understood that the invention is not restricted to two-stroke carburetor engines, but can be applied to two-stroke engines/internal combustion engines in general.

It will also be understood that the invention is not limited to the illustrated and described embodiment, and that changes and modifications can be made within the scope of the following features and claims.

Two-stroke carburetor engines release an amount of non-combusted fuel through their exhaust pipe. The amount of non-combusted fuel thus emitted will depend on the engine speed. The exhaust system is normally adapted to generate a back pressure to counteract this emission, although the back pressure will only function effectively at a given engine speed. The amount of non-combusted fuel emitted through the exhaust system will thus vary with varying engine speeds. When fitting a conventional catalyst burner in the exhaust system, there is a danger that the catalyst will become too hot and therewith destroyed when large quantities of non-combusted fuel are emitted from the engine. The noble metal coating of the catalyst is liable to be burned off and the ceramic material to be cracked.

An object of the present invention is to provide a reactor arrangement that will function effectively even on two-stroke engines and that will have a long useful life.

This object can be achieved in principle with the aid of a combustion chamber placed upstream of the catalyst and also with the aid of a heat exchanger for transferring heat from the catalyst exhaust gases to the combustion chamber. The inventive catalyst arrangement can have a precombustion chamber upstream of the catalyst, and a heat exchanger for transferring heat from the catalyst exhaust gases to the precombustion chamber. The precombustion chamber can be comprised of an expansion chamber for tuning the resistance of engine exhaust gases. A second heat exchanger can be downstream in the catalyst exhaust gases to transfer heat to the gas present in the conduit extending between the precombustion chamber and the catalyst inlet. The heat exchanger can be comprised of a conduit means that extends transversely through the expansion chamber, said conduit means having an aerodynamic cross-sectional shape so as to have the least possible disturbing effect on the flow in the expansion chamber. The heat exchanger conduit means can have a cross-sectional shape essentially in the form of a symmetrical wing-profile, and can be provided with fins.

Additionally, there can be a method of cleansing the exhaust gases from a two-stroke engine by means of a catalyst arrangement, characterized by initiating a precombustion upstream of the actual catalyst combustion, with the aid of heat taken from the catalyst exhaust gases. The method can also include initiating the precombustion process in an engine exhaust-gas expansion chamber and using said expansion chamber to tune the exhaust resistance of the engine.

It is also possible that embodiments of the present invention can be utilized in, for example, four-stroke or other engines.

The present invention may be used, for example, in engines such as snowmobile engines, lawn mower or lawn tractor engines, moped or motorcycle engines, outboard motors for boats or other similar engines.

One feature of the present invention resides broadly in a catalyst arrangement, particularly for two-stroke engines, characterized by a precombustion chamber (13, 14, 15) upstream of the catalyst (22), and a heat exchanger (17) for transferring heat from the catalyst exhaust gases to the precombustion chamber.

Another feature of the present invention resides broadly in that the precombustion chamber is comprised of an expansion chamber (13, 14, 15) for tuning the resistance of engine exhaust gases.

Yet another feature of the present invention resides broadly in that a second heat exchanger (18, 20) downstream in the catalyst (22) exhaust gases to transfer heat to the gas present in the conduit extending between the precombustion chamber (13, 14, 15) and the catalyst inlet (21).

Still another feature of the present invention resides broadly in that the heat exchanger (17) is comprised of a conduit means that extends transversely through the expansion chamber (13, 14, 15), said conduit means having an aerodynamic cross-sectional shape so as to have the least possible disturbing effect on the flow in the expansion chamber.

Another feature of the present invention resides broadly in that the heat exchanger conduit means (17) has a cross-sectional shape essentially in the form of a symmetrical wing-profile, and is provided with fins (31).

Still another feature of the present invention resides broadly in a method of cleansing the exhaust gases from a two-stroke engine by means of a catalyst arrangement, characterized by initiating a precombustion upstream of the actual catalyst combustion, with the aid of heat taken from the catalyst exhaust gases.

Another feature of the present invention resides broadly in initiating the precombustion process in an engine exhaust-gas expansion chamber (13, 14, 15) and using said expansion chamber to tune the exhaust resistance of the engine.

The following U.S. patents, which may contain two cycle motors, or components thereof, which may be used in embodiments of the present invention, are hereby incorporated by reference as if set forth in their entirety herein: U.S. Pat. No. 5,857,435, issued Jan. 12, 1999; U.S. Pat. No. 5,823,150, issued Oct. 20, 1998; U.S. Pat. No. 5,769,041, issued Jun. 23, 1998; U.S. Pat. No. 5,769,040, issued Jun. 23, 1998; U.S. Pat. No. 5,724,938, issued Mar. 10, 1998; U.S. Pat. No. 5,611,302, issued Mar. 18, 1997; U.S. Pat. No. 5,370,088, issued Jan. 3, 1995; U.S. Pat. No. 5,361,732, issued Nov. 8, 1994; U.S. Pat. No. 5,251,583, issued Oct. 12, 1993; and U.S. Pat. No. 5,245,824, issued Sep. 21, 1993.

Examples of snowmobiles, and components thereof, in which the present invention may be utilized, may be found in the following U.S. patents: U.S. Pat. No. 5,904,217, issued May 18, 1999; U.S. Pat. No. 5,902,021, issued May 11, 1999; U.S. Pat. No. 5,853,061, issued Dec. 29, 1998; U.S. Pat. No. 5,730,510, issued Mar. 24, 1998; U.S. Pat. No. 5,727,643, issued Mar. 17, 1998; U.S. Pat. No. 5,713,645, issued Feb. 3, 1998; U.S. Pat. No. 5,700,020, issued Dec. 23, 1997; U.S. Pat. No. 5,692,579, issued Dec. 2, 1997; U.S. Pat. No. 5,685,387, issued Nov. 4, 1997; U.S. Pat. No. 5,673,772, issued Oct. 7, 1997; U.S. Pat. No. 5,660,245, issued Aug. 26, 1997; U.S. Pat. No. 5,472,215, issued Dec. 13, 1994; U.S. Pat. No. 5,152,255, issued Oct. 6, 1992; U.S. Pat. No. 5,060,745, issued Dec. 29, 1991; U.S. Pat. No. 4,917,207, issued Apr. 17, 1990; U.S. Pat. No. 4,237,997, issued Dec. 9, 1980; U.S. Pat. No. 4,186,291, issued Jan. 29, 1980; U.S. Pat. No. 3,776,354, issued Dec. 4, 1973; and U.S. Pat. No. 3,773,127, issued Nov. 20, 1973.

Examples of lawn mowers in which the present invention may be utilized, may be found in the following U.S. patents: U.S. Pat. No. 5,921,072, issued Jul. 13, 1999; U.S. Pat. No. 5,915,496, issued Jun. 29, 1999; U.S. Pat. No. 5,913,802, issued Jun. 22, 1999; U.S. Pat. No. 5,901,536, issued May 11, 1999; U.S. Pat. No. 5,893,817, issued Apr. 13, 1999; U.S. Pat. No. 5,890,354, issued Apr. 6, 1999; U.S. Pat. No. 5,887,484, issued Mar. 30, 1999; U.S. Pat. No. 5,878,730, issued Mar. 9, 1999; U.S. Pat. No. 5,873,287, issued Feb. 23, 1999; U.S. Pat. No. 5,832,708, issued Nov. 10, 1998; U.S. Pat. No. 5,822,961, issued Oct. 20, 1998; U.S. Pat. No. 5,809,756, issued Sep. 22, 1998; U.S. Pat. No. 5,797,251, issued Aug. 25, 1998; and U.S. Pat. No. 5,775,078, issued Jul. 7, 1998.

Examples of outboard motors which may be used in embodiments of the present invention may be found in the following U.S. Patents: U.S. Pat. No. 5,921,829, issued Jul. 13, 1999; U.S. Pat. No. 5,921,827, issued Jul. 13, 1999; U.S. Pat. No. 5,915,363, issued Jun. 29, 1999; U.S. Pat. No. 5,913,294, issued Jun. 22, 1999; U.S. Pat. No. 5,911,610, issued Jun. 15, 1999; U.S. Pat. No. 5,911,608, issued Jun. 15, 1999; U.S. Pat. No. 5,910,191, issued Jun. 8, 1999; U.S. Pat. No. 5,908,338, issued Jun. 1, 1999; U.S. Pat. No. 5,904,605, issued May 18, 1999; U.S. Pat. No. 5,899,778, issued May 4, 1999; U.S. Pat. No. 5,893,783, issued Apr. 13, 1999, U.S. Pat. No. 5,873,347, issued Feb. 23, 1999; U.S. Pat. No. 5,822,985, issued Oct. 20, 1998; U.S. Pat. No. 5,803,036, issued Sep. 8, 1998; U.S. Pat. No. 5,778,848, issued Jul. 14, 1998; and U.S. Pat. No. 5,778,847, issued Jul. 14, 1998.

Examples of catalysts, or catalytic systems, which may be used in embodiments of the present invention, may be found in the following U.S. patents: U.S. Pat. No. 5,836,152, issued Nov. 17, 1998; U.S. Pat. No. 5,345,762, issued Sep. 13, 1984; U.S. Pat. No. 3,885,539, issued May 27, 1975; U.S. Pat. No. 5,921,080, issued Jul. 13, 1999; U.S. Pat. No. 5,911,961, issued Jun. 15, 1999; U.S. Pat. No. 5,897,846, issued Apr. 27, 1999; U.S. Pat. No. 5,887,421, issued Mar. 30, 1999; U.S. Pat. No. 5,884,474, issued Mar. 23, 1999; U.S. Pat. No. 5,867,983, issued Feb. 9, 1999; U.S. Pat. No. 5,822,982, issued Oct. 20, 1998; U.S. Pat. No. 5,839,276, issued Nov. 24, 1998; U.S. Pat. No. 5,839,273, issued Nov. 24, 1998; U.S. Pat. No. 5,791,139, issued Aug. 11, 1998; and U.S. Pat. No. 5,744,104, issued Apr. 28, 1998.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Swedish Patent Application No. 9700459-2, filed on Feb. 10, 1997, having the inventor Mats Tikka, and published Swedish Patent Application No. 9700459-2, and Swedish Patent No. 9700459-2, and International Application No. PCT/SE98/00216, filed on Feb. 8, 1998, and publication No. WO 98/35142, having the inventor Mats Tikka, as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A two cycle carbureted gasoline engine comprising:
   an induction system to induct fuel and air into said two cycle engine;
   at least one cylinder arrangement to combust the fuel and air mixture of said two cycle engine;
   a piston arrangement disposed in said at least one cylinder arrangement;
   said at least one cylinder arrangement being configured to combust the fuel and air mixture of said two cycle engine during each two cycle movement of said piston arrangement;
   an ignition system disposed to combust the fuel and air mixture in said at least one cylinder during each two cycle movement of said piston arrangement;
   an exhaust system to exhaust gases from said at least one cylinder, said exhaust system comprising:
   reactor and a precombustion chamber;
   said precombustion chamber being disposed between said at least one cylinder and said reactor; and
   a heat exchanger configured and disposed to transfer heat from exhaust gases from said reactor to said precombustion chamber.

2. The two cycle carbureted gasoline engine according to claim 1 in combination with one of:
   a snowmobile;
   an outboard motor;
   a motorcycle; and
   a lawn tractor.

3. The two cycle carbureted gasoline engine according to claim 2, wherein said precombustion chamber comprises an expansion chamber for tuning the resistance of engine exhaust gases.

4. The two cycle carbureted gasoline engine according to claim 3, comprising a second heat exchanger downstream in the reactor exhaust gases to transfer heat to the gas present in a conduit extending between said precombustion chamber and a reactor inlet.

5. The two cycle carbureted gasoline engine according to claim 4, wherein said heat exchanger comprises a conduit arrangement that extends transversely through said expansion chamber, said conduit arrangement having an aerodynamic cross-sectional shape so as to minimize any disturbing effect on the flow in the expansion chamber.

6. The two cycle carbureted gasoline engine according to claim 5, wherein said heat exchanger conduit arrangement has a cross-sectional shape essentially in the form of a symmetrical wing-profile, and is provided with fins.

7. The two cycle carbureted gasoline engine according to claim 2, wherein said reactor comprises a catalytic reactor and said precombustion chamber comprises an expansion chamber for tuning the resistance of engine exhaust gases.

8. The two cycle carbureted gasoline engine according to claim 7, comprising a second heat exchanger downstream in the reactor exhaust gases to transfer heat to the gas present in a conduit extending between said precombustion chamber and a reactor inlet.

9. The two cycle carbureted gasoline engine according to claim 8, wherein said heat exchanger comprises a conduit arrangement that extends transversely through said expansion chamber, said conduit arrangement having an aerodynamic cross-sectional shape so as to minimize any disturbing effect on the flow in the expansion chamber.

10. The two cycle carbureted gasoline engine according to claim 9, wherein said heat exchanger conduit arrangement has a cross-sectional shape essentially in the form of a symmetrical wing-profile, and is provided with fins.

11. A method of operating a two cycle engine, the two cycle engine comprising: an induction system to induct fuel and air into the two cycle engine, at least one cylinder arrangement to combust the fuel and air mixture of the two cycle engine, a piston arrangement disposed in the at least one cylinder arrangement, the at least one cylinder arrangement being configured to combust the fuel and air mixture of the two cycle engine during each two cycle movement of the piston arrangement, an ignition system disposed to combust the fuel and air mixture in the at least one cylinder during each two cycle movement of the piston arrangement, an exhaust system to exhaust gases from the at least one cylinder, the exhaust system comprising: a reactor and a precombustion chamber, the precombustion chamber being disposed between the at least one cylinder and the reactor, and a heat exchanger configured and disposed to transfer heat from exhaust gases from the reactor to the precombustion chamber, said method comprising the steps of:
   providing fuel and air to the engine to be combusted in the engine;
   combusting fuel and air in the cylinder to drive the piston arrangement;

exhausting exhaust gases from the reactor;

transferring heat in the heat exchanger from exhaust gases from the reactor to the precombustion chamber.

12. The method according to claim 11 comprising the step of initiating a precombustion upstream of the actual reactor combustion, with the aid of heat taken from the reactor exhaust gases.

13. The method according to claim 12, wherein the precombustion chamber comprises an expansion chamber, said method comprises the steps of:

initiating the precombustion process in the engine exhaust-gas expansion chamber; and using the expansion chamber to tune the exhaust resistance of the engine.

14. A gasoline engine comprising:

an induction system to induct fuel and air into said engine;

at least one cylinder arrangement to combust the fuel and air mixture of said engine;

a piston arrangement disposed in said at least one cylinder arrangement;

said at least one cylinder arrangement being configured to combust the fuel and air mixture of said engine during each movement of said piston arrangement;

an ignition system disposed to combust the fuel and air mixture in said at least one cylinder during each movement of said piston arrangement;

an exhaust system to exhaust gases from said at least one cylinder, said exhaust system comprising:

a reactor and a precombustion chamber;

said precombustion chamber being disposed between said at least one cylinder and said reactor; and a heat exchanger configured and disposed to transfer heat from exhaust gases from said reactor to said precombustion chamber.

15. The gasoline engine according to claim 14 in combination with one of:

a snowmobile;

an outboard motor;

a motorcycle; and a lawn tractor.

16. The gasoline engine according to claim 15, wherein said precombustion chamber comprises an expansion chamber for tuning the resistance of engine exhaust gases.

17. The gasoline engine according to claim 16, comprising a second heat exchanger downstream in the reactor exhaust gases to transfer heat to the gas present in a conduit extending between said precombustion chamber and a reactor inlet.

18. The gasoline engine according to claim 17, wherein said heat exchanger comprises a conduit arrangement that extends transversely through said expansion chamber, said conduit arrangement having an aerodynamic cross-sectional shape so as to minimize any disturbing effect on the flow in the expansion chamber, and said heat exchanger conduit arrangement has a cross-sectional shape essentially in the form of a symmetrical wing-profile, and is provided with fins.

19. The gasoline engine according to claim 15, wherein said reactor comprises a catalytic reactor and said precombustion chamber comprises an expansion chamber for tuning the resistance of engine exhaust gases.

20. The gasoline engine according to claim 19, comprising a second heat exchanger downstream in the reactor exhaust gases to transfer heat to the gas present in a conduit extending between said precombustion chamber and a reactor inlet, said heat exchanger comprises a conduit arrangement that extends transversely through said expansion chamber, said conduit arrangement having an aerodynamic cross-sectional shape so as to minimize any disturbing effect on the flow in the expansion chamber, and said heat exchanger conduit arrangement has a cross-sectional shape essentially in the form of a symmetrical wing-profile, and is provided with fins.

* * * * *

UNITED STATES PATENT AND TRADEMARK OFFICE
CERTIFICATE OF CORRECTION

PATENT NO.     : 6,216,447 B1
DATED          : April 17, 2001
INVENTOR(S)    : Mats Tikka It is certified that error appears in the above-identified patent and that said Letters Patent is hereby corrected as shown below:

<u>Title page,</u>
Item [56] under the U.S. PATENT DOCUMENTS section, after the '3,968,649' reference, delete "5,396,797" and insert -- 5,396,767 --.

<u>Column 7, claim 1,</u>
Line 62, before "reactor" insert -- a --.

Signed and Sealed this

Second Day of April, 2002

Attest:

JAMES E. ROGAN
*Director of the United States Patent and Trademark Office*

*Attesting Officer*